J. S. Y. FRALICH.
HAND ACTUATED BRAKE MECHANISM.
APPLICATION FILED APR. 8, 1913.
1,066,594.
Patented July 8, 1913.
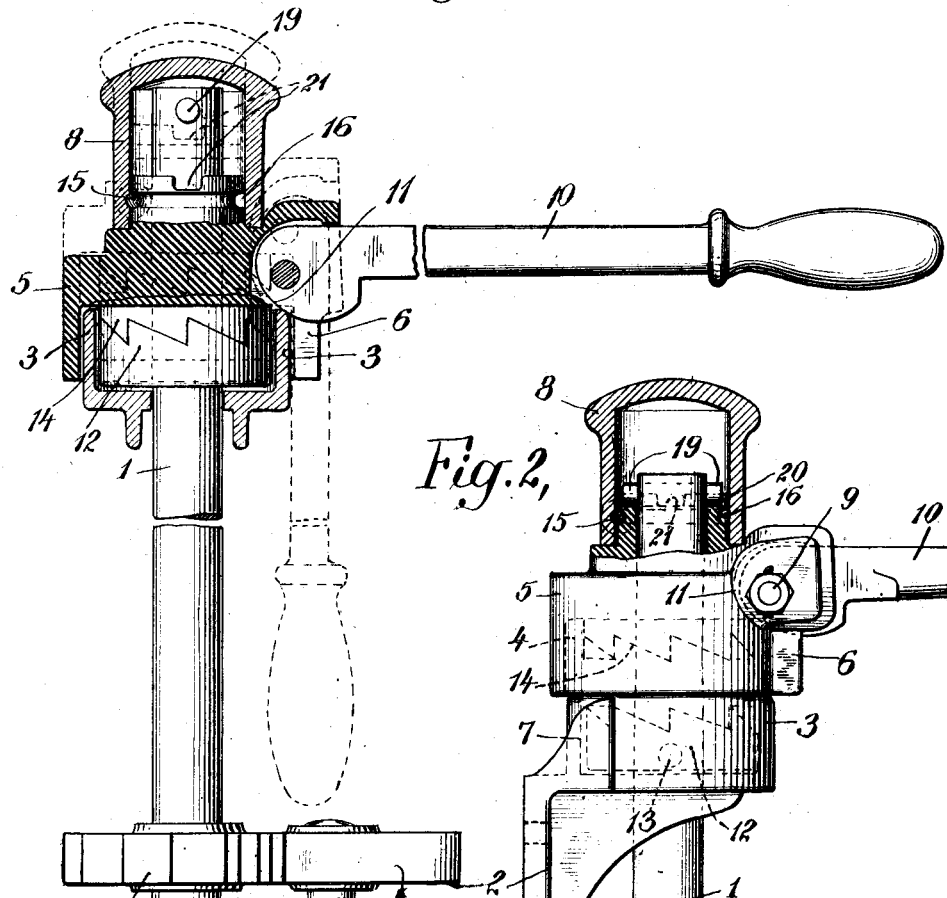
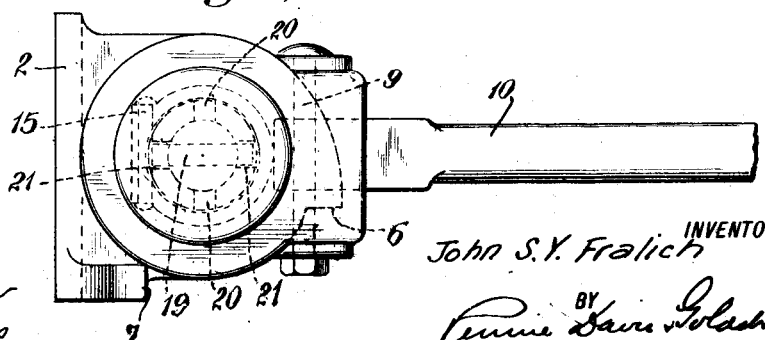

UNITED STATES PATENT OFFICE.

JOHN S. Y. FRALICH, OF PITTSBURGH, PENNSYLVANIA, ASSIGNOR TO RATCHET BRAKE COMPANY, OF NEW YORK, N. Y., A CORPORATION OF DELAWARE.

HAND-ACTUATED BRAKE MECHANISM.

1,066,594.   Specification of Letters Patent.   Patented July 8, 1913.

Application filed April 8, 1913. Serial No. 759,650.

*To all whom it may concern:*

Be it known that I, JOHN S. Y. FRALICH, a citizen of the United States, and resident of Pittsburgh, in the county of Allegheny and State of Pennsylvania, have invented certain new and useful Improvements in Hand-Actuated Brake Mechanism; and I do hereby declare the following to be a full, clear, and exact description of the invention, such as will enable others skilled in the art to which it appertains to make and use the same.

The present invention relates to hand-actuated brake-mechanism of the kind in which an oscillating movement of the operating lever through a suitable angle is used to apply the brakes, the operating lever being normally clutched to the brake staff in the brake applying direction of movement, and being normally unclutched therefrom in the retracting direction of movement; and it relates more particularly to auxiliary means in such an organization for positively connecting the operating lever to the brake staff in the retracting direction of movement in order to positively turn the brake staff and thereby take the tension off the hand brake rods in case the brake releasing movement is arrested before the chain or other connection is entirely slacked; a condition which quite frequently occurs in the practical operation of railway brakes, and which may ordinarily be overcome by a positive movement of the brake staff in the releasing direction.
In brake mechanism of the kind mentioned, one clutch member is usually connected to the operating lever and a coöperating clutch member is usually connected to the brake staff, the two clutch members being operatively engaged in one direction of the oscillating movement of the operating lever and being disengaged in the reverse direction. The idea embodied in this invention may be applied to such mechanism by providing auxiliary means for operatively connecting the operating lever to the brake staff in the direction of the retracting movement, so that the brake staff may be positively turned in that direction to force the mechanism to the point at which the brake shoes may have sufficient clearance on the wheels. This auxiliary connection is preferably, though not necessarily, a positive one, permitting the direct actuation of the brake staff in either direction.

In the following specific disclosure of the invention, it is illustrated as applied to the form of hand-actuated brake-mechanism described in United States Patent Number 934,935, of September 21, 1909. However, it is to be understood that the utility of the invention is in no wise limited to this form of mechanism, but on the contrary, it is applicable to various forms of oscillating brake mechanism within the broad interpretation of the appended claims.

In the accompanying drawings, Figure 1 is a vertical elevation, partly in section, showing the brake staff and the actuating mechanism therefor; Fig. 2 is a vertical elevation, partly in section, showing the upper part of the mechanism in position for effecting the auxiliary positive connection between the brake staff and the lever; and Fig. 3 is a plan view of the upper part of the mechanism.

The brake actuating mechanism may be installed in or on a passenger or freight car at any convenient place at which the brake rigging may be connected to it by a chain or otherwise in any suitable way. The brake staff 1 is supported at its upper end in a bearing in the bracket 2, which is adapted to be fastened to a suitable support for holding the actuating mechanism rigidly in place. This bracket also carries an upwardly extending circular flange 3 adapted to fit within the circular groove 4 on the under side of the housing base 5 in such manner that the housing may be turned around until the lug 6 thereon comes against the stationary abutment 7 on the bracket at the limit of its movement in the brake releasing direction. The upper part of the housing consists of a cylindrical cap 8 of such shape as to conveniently fit the hand of the brakeman. The housing base has two lugs, between which extends the bolt 9 for a pivot connection to the operating lever 10.
The inner end of the operating lever is shaped to a cam surface 11 adapted to engage the stationary flange 3 and thereby lift the housing 5, 8 when the lever is moved from its horizontal position to its vertical position. The face ratchet 12 is fastened on the brake staff by the pin 13, while the coöperative face ratchet 14 is, in the embodiment shown, integral with the housing and is positively connected to the cap 8 by the pin 15 fitting within the circumferential groove 16 on the hub of the ratchet and a tangential groove in the cap, as shown. The ratchet 14 has a cut-away portion to permit the projection thereinto of the inner end of the operating lever as shown in Fig. 1.

The arrangement of the face ratchets 12 and 14, forming the coöperative clutch members between the operating lever and the brake staff, is such that when the operating lever is raised to its horizontal position, the housing parts 5 and 8 fall by their own weight until the teeth of the face ratchets operatively engage each other as shown in full lines in Fig. 1, while, when the operating lever is moved to its vertical position, the housing parts and the face ratchet 14 are raised until the ratchets are entirely disengaged, as shown in broken lines in Fig. 1. Thus, when it is desired to apply the brakes, the operating lever is brought to its horizontal operating position, and it is then moved in a counter-clockwise direction, as viewed in Fig. 3, thereby turning the brake staff 1 in this direction, and then the operating lever is moved in the retracting direction and the brake applying operation is repeated as often as necessary The teeth of the upper ratchet slide over those of the lower ratchet in the retracting movement, while the ratchet gear 17 and the foot pawl 18 are arranged in the ordinary way to hold the brake staff from releasing during this retracting period.

For the purpose of establishing a direct connection between the lever and the brake staff, in case the brake releasing movement is arrested as a result of a binding action or other causes, or if, for any other reason it becomes desirable to effect such a direct connection, I provide in the specific form of brake mechanism herein disclosed, a pin 19 extending through the brake staff and outwardly therefrom on both sides at a place above the top of the hub of the ratchet 14 when the operating lever occupies its vertical position. The housing may be raised above this position to the point at which the extremities of this pin 19 lie within the grooves 20 or 21 to positively connect the housing and the operating lever to the brake staff. If the operating lever now be turned in a clockwise direction, as viewed in Fig. 3, the brake staff will be forced in the direction to slack the chain or other connection to the brakes, and this movement may be repeated until the connection is entirely slackened or until the tendency of the brake staff to resist the releasing movement is overcome. Thus, any improper action, resulting for instance from a bent brake staff or any binding tendency in the bearings or foundation gear, may be easily overcome without requiring that the brakeman move from the place of the brake actuating mechanism.

Having thus described my invention, what I claim is:

1. In hand-actuated brake mechanism, the combination with a rotatable brake staff, an operating lever adapted to be oscillated about the brake staff, and a clutch adapted to convert the oscillating movement of the lever into a brake-applying movement of the brake staff, of auxiliary means for connecting the lever to the brake staff to effect a reverse or brake-releasing movement thereof when desired; substantially as described.

2. In hand-actuated brake mechanism, the combination with a rotatable brake staff, an operating lever adapted to be oscillated about the brake staff, and a clutch adapted to convert the oscillating movement of the lever into a brake-applying movement of the staff, of auxiliary means for effecting a direct connection between the actuating lever and the brake staff at will; substantially as and for the purpose described.

3. In hand-actuated brake-mechanism, a rotatable brake staff, an operating lever adapted to be oscillated about the brake staff, a face ratchet fastened on the brake staff, and a coöperating face ratchet operatively connected to the operating lever and provided with engaging notches, said ratchets being arranged to operatively engage each other to convert the oscillating movement of the lever into a brake-applying movement of the brake-staff, in combination with a pin carried by the brake staff in such position as to be engaged at will by the notches in the ratchet when the two ratchets are sufficiently disengaged from each other, said notches and pin forming a direct connection between the brake staff and the operating lever; substantially as described.

In testimony whereof I affix my signature, in presence of two witnesses.

JOHN S. Y. FRALICH.

Witnesses:
ROBERT H. BLACKALL,
W. E. HOWETT.

Copies of this patent may be obtained for five cents each, by addressing the "Commissioner of Patents, Washington, D. C."